July 18, 1944.  J. FESS  2,354,004
CONDIMENT HOLDER
Filed Dec. 8, 1941
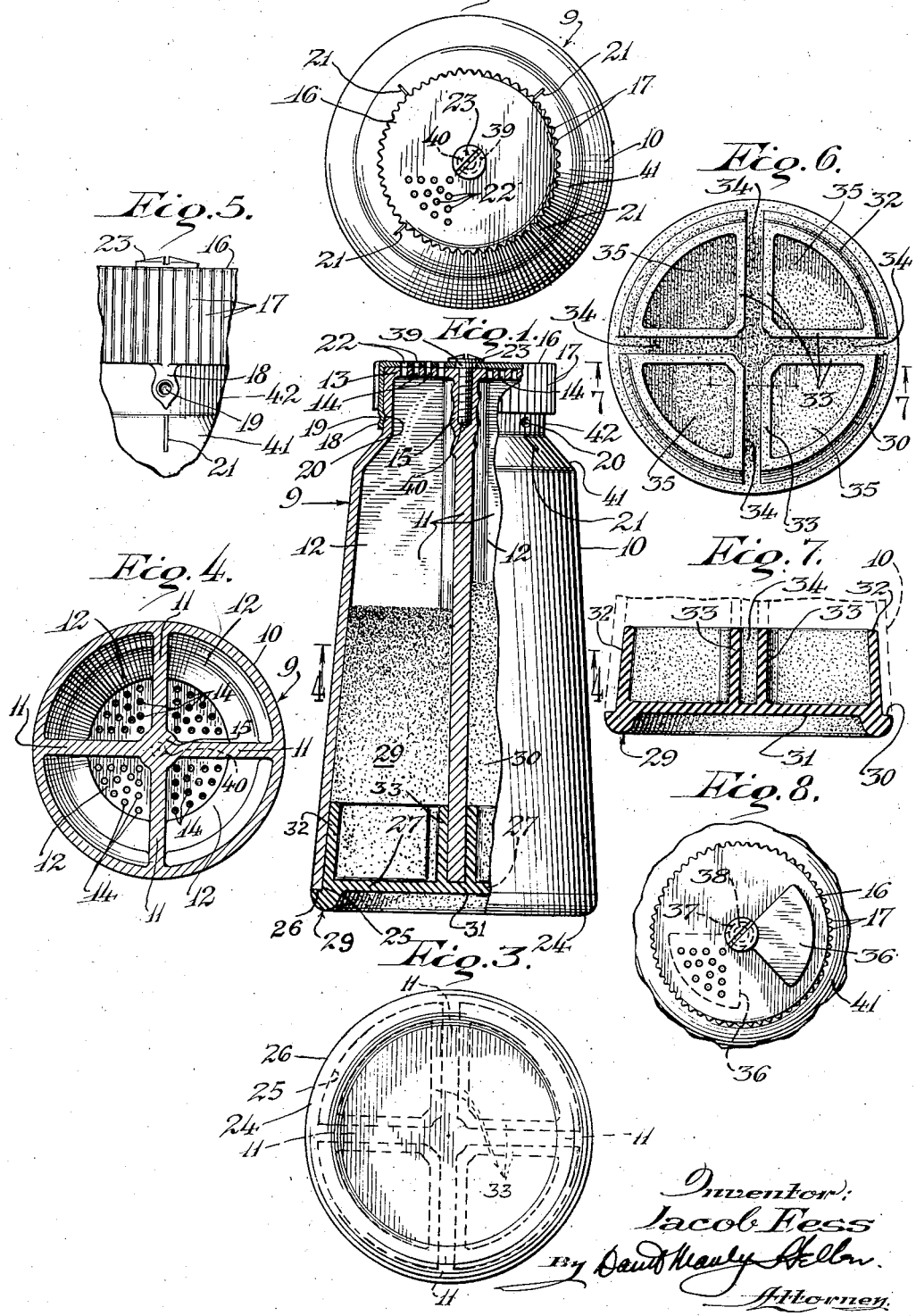
Inventor:
Jacob Fess Patented July 18, 1944

2,354,004

UNITED STATES PATENT OFFICE 2,354,004

CONDIMENT HOLDER

Jacob Fess, Chicago, Ill.

Application December 8, 1941, Serial No. 422,027

3 Claims. (Cl. 65—45)

This invention relates to condiment holders and particularly with respect to a type of condiment holder which has a plurality of compartments adapted to store a number of different condiments or seasoning substances.

Another object of this invention is to provide a simple means to permit filling the various compartments within the said condiment holder with different condiments or seasoning ingredients.

Another object of this invention is to provide a seal for the dispensing means which will close the dispensing means when the condiment holder is not in use and thus prevent the materials or ingredients within the condiment holder from being attacked or contaminated by moisture, thus preventing the said ingredients from being subjected to varied atmospheric conditions.

Another object of this invention is to provide a practical, useful, and efficient structure for the purposes aforementioned, and one that is of such a simple construction as to warrant economical manufacture in quantity production.

Other features and advantages of this invention may become apparent by reference to the accompanying drawing illustrating preferred embodiments of my invention and to the ensuing description in which;

Fig. 1 is a front view partly in elevation and partly in longitudinal cross-section showing the elemental structure of my invention.

Fig. 2 is a top view thereof.

Fig. 3 is a bottom view thereof showing the corks utilized for sealing the filler openings, removed.

Fig. 4 is a transversal cross-sectional view on the line 4—4 of Figure 1.

Fig. 5 is an enlarged fragmentary view showing the indexing structure comprising my invention.

Fig. 6 is a detail of the bottom element to be used in connection with my invention.

Fig. 7 is a longitudinal cross-sectional view on the line 7—7 of Figure 6.

Fig. 8 is a fragmentary top view showing a slight modification embodying the sealing means used in connection with my invention.

Referring more particularly to Figures 1, 2, 3, 4 and 5, my invention generally designated 9 is comprised of a tapered body 10, which is made up of a plastic material of suitable thickness, and has a bottom shoulder 26, a reduced portion 41, and a neck portion 42 terminating in a closed or integral top portion 13.

The inner compartment or recess of the body 10, is subdivided into four compartments 12 by virtue of the cross-ribbed members 11, which meet at the geometric center of the construction and are preferably reinforced by the added material 15 at their intersections in order to provide sufficient material for a threaded hole in order to accommodate the screw 23, the purpose of which will be hereinafter elucidated.

The top portion 13 is provided with a series of perforations or openings 14 and each aligns with one of the compartments 12 when in registry with the holes 22 of the dispensing means for permitting the ingredients or seasoning 29 or 30 to be dispensed from the container as desired.

To the neck portion 42 of the body 10 is secured a cap element 16 which is more or less in working fit relationship over the neck portion 42 and the top portion 13, and the said cap element is provided with a series of corrugations 17 in order to adapt it to be readily grasped by the fingers and is further provided with an indexing pointer 18, having an indentation 19, which is adapted for snap engagement with indentation 20 located on the neck portion 42; so that when the element 16 is rotated the pointer is caused to snap into engagement with the indentation 20 when the pointer is in registry with the marking or indentation 21, showing that the holes 22 located in the cap element 16 are in registry or alignment with the holes 14 of a particular cavity 12 within the condiment holder, permitting the contents thereof to pass thru freely by virtue of the congruent alignment of the holes 14 and 22 respectively.

In order to effect a smooth rotative operating action of the element 16, the screw member 23 is provided with a shoulder portion 39 which is slightly thicker than the thickness of the top portion of the element 16 so as to allow freedom of rotation, even tho the screw 23 having threaded portion 40 is secured rather firmly in the threaded hole provided in the portion 15; the rotation of the element 16 will thus prevent the screw from being unlocked, or jarred loose.

The body portion for manufacturing reasons is made open at the bottom and terminating in the edge 26, has secured thereto a bottom element 29, having a shoulder portion 30 adapted to fit snugly against the shoulder 26 of the holder body 10.

In Figures 6 and 7, I show a detail view of the bottom portion which is, preferably, made of soft rubber and is generally designated 29, having a shoulder portion 30, and side wall portions 32 adapted to fit the inner tapered form of the body 10, the shoulder 30 abutting against the shoulder 26 of the body 10 of the condiment holder. The member 29 is provided with a series of ribbed portions 33 leaving gaps or openings therebetween 34, which are connected to the walls 32 and which are adapted to accommodate snugly the ribs 11 of the condiment holder body thus leaving resultant compartments 35 above the bottom member 29 adapted to fall in alignment with the openings 12 of the condiment holder proper, hence when the said bottom element 29 is removed, the body of the condiment holder may be filled with various condiments and then this bottom portion replaced snugly which will maintain the contents within the condiment holder and will prevent the moisture of the atmosphere from attacking the said condiments. In this particular case the bottom acts as a sealed closure and no corks are necessary. The member 29 may be recessed as at 31 thus furnishing a suctional grip when pressure is exerted thereupon, thus securing the holder firmly to a support.

In the fragmentary view of Figure 8, a slight improvement is indicated in providing a closure generally designated 36 which has an extension 37 and an opening 38 adapted to fit the shoulder portion 39 of the screw 23. In this particular instance, the shoulder 39 would be correspondingly thicker in order to accommodate the thickness of the element 36 so as to keep it firmly in between the head of the screw and the top surface of the cap element 16, so that it will not rotate freely but will require a slight effort to place it in either position indicated at Figure 8; thus when the cap is rotated, the element 36 will remain put in place as shown by the full lines or any other position along the top surface and moved accordingly therewith, whereas when it is desired to completely seal the condiment holder and put it away for future use, the element 36 may be rotated over the cover to the dotted position indicated and thus effect a seal.

In the event that this condiment holder is not made of a transparent substance, then the portion 41 may be inscribed with a marking designating the condiment in the compartment aligned with a respective graduation 21.

In use, the element 16 is rotated until the pointer registers with a particular graduation 21, whence the holder will permit shaking out gradually the contents from its respective compartment. The contents of the remaining compartments will not be ejected inasmuch as the cover possesses only one series of holes 22.

I believe that my invention has been described rather succinctly, and inasmuch as it is susceptible of modification within the scope and spirit thereof, I reserve the right to any such modifications coming within the scope of the accompanying drawing as well as within the purview of the foregoing description.

Having thus revealed my invention what I claim as novel and desire to secure by Letters Patent is:

1. A device of the character described comprising, body means subdivided into a multiplicity of compartments, cap means provided with dispensing means rotatably mounted on the top of said body means, resilient and removable bottom means secured to the said body means, the said bottom means comprising, a body portion, and a bottom portion subdivided into a number of walled compartments each adapted to fit resiliently and removably a compartment in the said body means.

2. In a device of the character described, removable bottom sealing means made of rubber and comprising, a body portion, and a bottom portion subdivided into a multiplicity of walled sections confining compartments adjacent walls of adjacent compartments defining recesses, the said recesses adapted to fit partition walls of a container defining compartments equal in number to the number of walled sections in the said bottom portion, each of said walled sections adapted to seal hermetically a corresponding compartment in said container.

3. In a device of the character described, in combination, a partitioned body element, and removable bottom means made of rubber and comprising, a body portion, a bottom portion subdivided into a number of walled sections confining compartments, adjacent walls of adjacent compartments defining recesses between the said walled sections adapted to receive slidably partitions of the said body element, the said body portion being removably secured within the said body element, each of said partitions adapted to fit into the said recesses between the said walled sections thus confining each of said walled sections within divisional portions confined between adjacent partitions of the said body element.

JACOB FESS.